United States Patent [19]
Osti et al.

[11] Patent Number: 5,179,814
[45] Date of Patent: Jan. 19, 1993

[54] CONTROLLED HEAT SEAL DEVICE FOR FASTENING WRAPPERS OF THERMOPLASTIC MATERIAL, IN PARTICULAR IN MACHINES FOR OVERWRAPPING PACKETS OF CIGARETTES AND THE LIKE

[75] Inventors: Roberto Osti, Zola Predosa; Alessandro Minarelli, Bologna, both of Italy

[73] Assignee: GD. S.p.A., Bologna, Italy

[21] Appl. No.: 885,741

[22] Filed: May 19, 1992

[30] Foreign Application Priority Data
May 20, 1991 [IT] Italy .............. BO91A000165

[51] Int. Cl.$^5$ .............................. B65B 51/16
[52] U.S. Cl. .................................. 53/75; 53/77; 53/375.9; 53/376.2; 53/376.7
[58] Field of Search ............. 53/75, 77, 375.9, 376.6, 53/376.7, 370.7, 371.4, 372.9, 377.8, 377.7, 376.2, 477; 156/583.1, 583.5

[56] References Cited
U.S. PATENT DOCUMENTS

| | | | |
|---|---|---|---|
| 2,851,839 | 9/1958 | Himes et al. | 53/372.9 |
| 2,855,977 | 10/1958 | Wagner | 53/376.7 X |
| 2,936,559 | 5/1960 | Galley et al. | 53/372.9 X |
| 3,979,881 | 9/1976 | Seragnoli | 53/77 |
| 5,085,028 | 2/1992 | Boriani et al. | 53/375.9 X |
| 5,123,226 | 6/1992 | Near | 53/375.9 X |

FOREIGN PATENT DOCUMENTS
1018092 9/1977 Italy.

Primary Examiner—James F. Coan
Attorney, Agent, or Firm—Cushman, Darby & Cushman

[57] ABSTRACT

Single commodities such as packets of cigarettes are enveloped in a thermoplastic wrapping and directed ultimately toward a heat seal station by way of a belt conveyor looped around at least one pulley; each packet is taken up from the belt, together with its wrapper, between two disks disposed coaxial with and on either side of the pulley, each consisting in two concentric circular rings rotating as one with the pulley and thermally insulated one from the other. The two inner rings are heated by resistances and positioned to engage and seal the end folds of the wrapper; as the seal is effected, the packet encounters a diverting element set between the disks and adjustable for position according to the operating speed of the wrapping machine, by which it is distanced from the center of the pulley and thus caused to pass from the inner rings to the unheated outer rings.

10 Claims, 1 Drawing Sheet

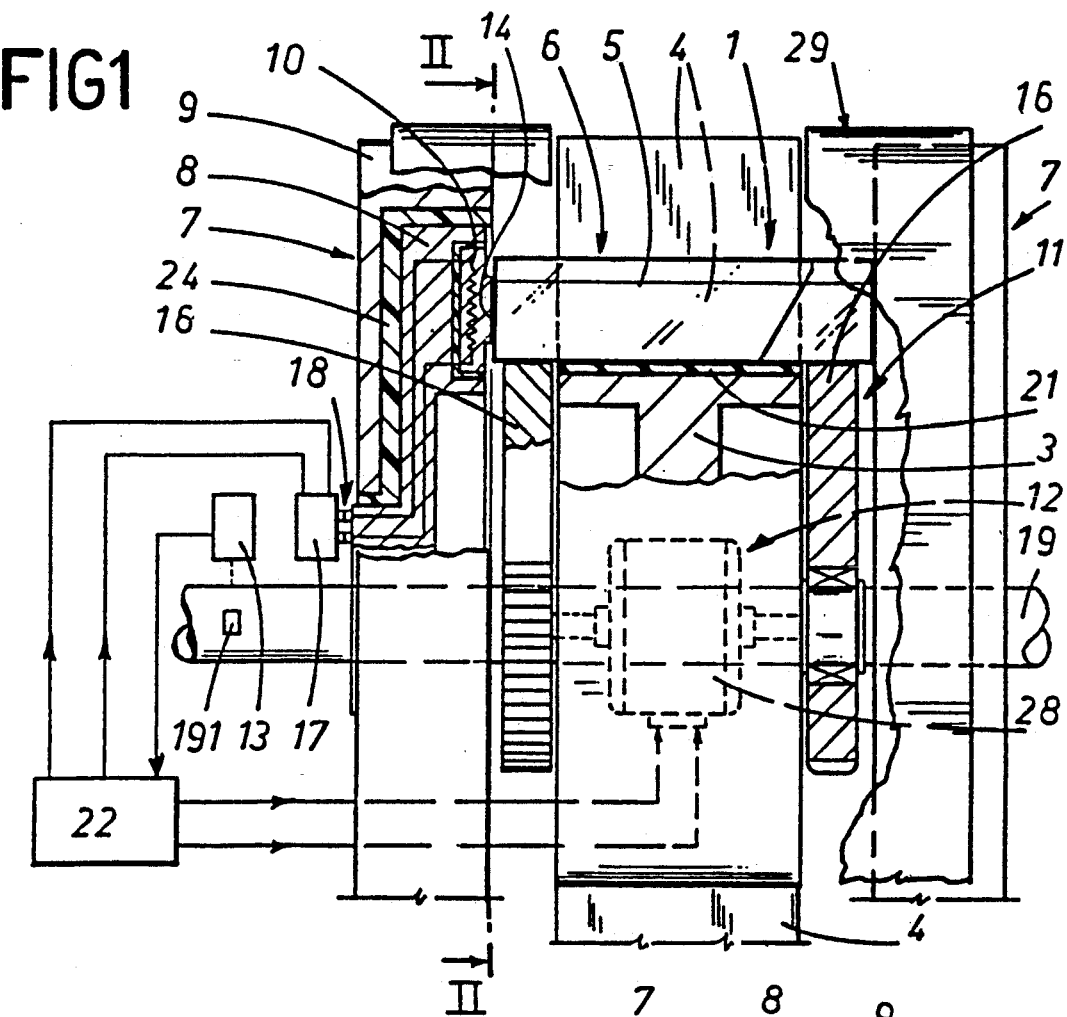
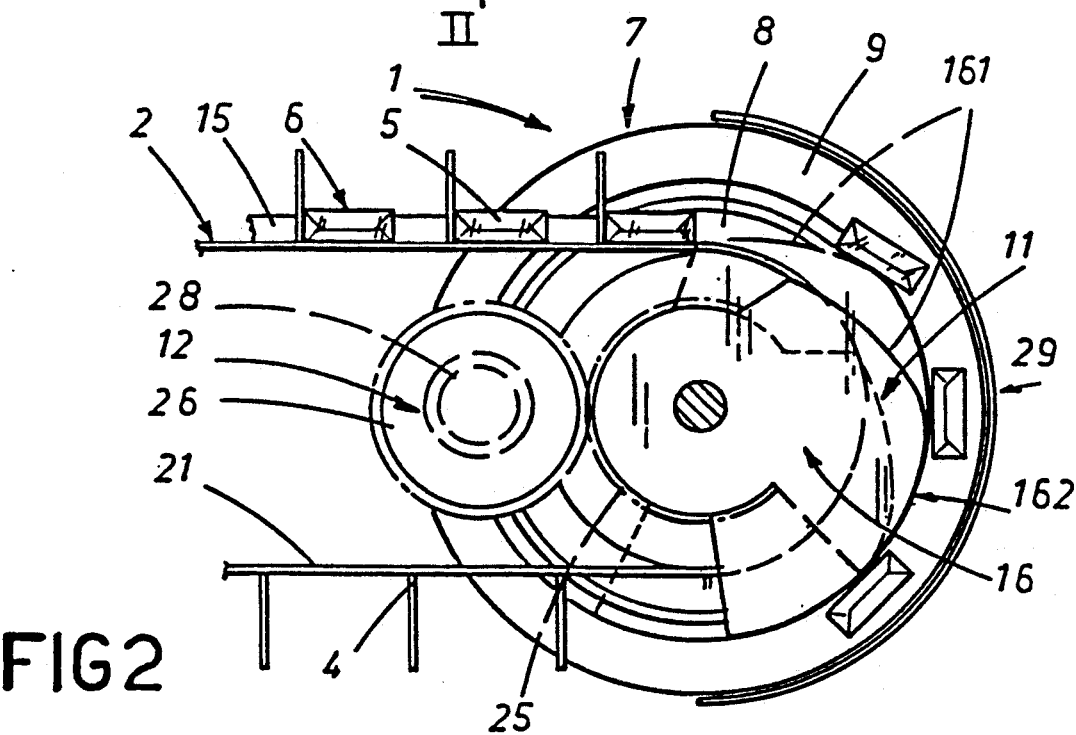

CONTROLLED HEAT SEAL DEVICE FOR FASTENING WRAPPERS OF THERMOPLASTIC MATERIAL, IN PARTICULAR IN MACHINES FOR OVERWRAPPING PACKETS OF CIGARETTES AND THE LIKE

BACKGROUND OF THE INVENTION

The present invention relates to a controlled heat seal device for fastening wrappers in thermoplastic material, applicable in particular to machines for overwrapping packets of cigarettes and commodities of a similar nature.

More particularly, the invention refers to a device designed to seal the end folds of such wrappers by a controlled application of heat.

Controlled heat seal devices of the type currently in use comprise a pair of heated plates positioned on opposite sides of a conveyor belt along which the single commodities are carried, each enveloped in a relative wrapper. The plates are reciprocated through an operating stroke, which brings them into contact with the end folds of the wrappers, and a corresponding return stroke.

It is essential with such devices that the duration of contact between the plates and the ends of the wrappers can be varied, since the thermoplastic material from which the wrappers are fashioned must be heated up to but not beyond a given temperature, whatever the operating speed of the machine.

The general practice is in fact to associate the heat plates with a non-adjustable source of energy, for example one or more electrical resistances, and then to determine the exact duration of the contact between plates and wrapper employing a variety of means.

Given that no wrapping machine will ever operate at one constant speed, it follows that the duration of contact between the heat plates and the wrapper end folds needs to be matched to the different speeds of the machine.

In Italian Patent Application 3438A/74, by way of example, the duration of contact between the heat seal plates and the wrapper end folds is determined by means of a single cam type element which affords two or more profiles engaged by a following roller associated mechanically with the plates.

Whilst the heat seal device embodied according to this principle has proved capable of effective and precise operation over time, it nonetheless betrays a marked lack of flexibility inasmuch as a change in the operating speed of the machine dictates the replacement of the cam, with obvious drawbacks.

The object of the invention is to provide a heat seal device affording a high degree of flexibility and dependability over time.

SUMMARY OF THE INVENTION

The stated object is realized according to the present invention in a controlled heat seal device for fastening wrappers of thermoplastic material, in particular in overwrapping machines comprising a belt conveyor looped around at least one pulley and affording a plurality of transverse slats by which single commodities enveloped in relative wrappers, typically packets of cigarettes, are fed positively toward the device. The essential features of such a device are: two mutually coaxial disks positioned on opposite sides of the conveyor, each consisting in at least one pair of concentric circular rings rotatable as one with the pulley and thermally insulated one from the other, disposed such that one ring of each pair operates in conjunction with the conveyor by taking up the commodities, each enveloped in a respective wrapper, from the surface of the belt; heat seal means associated with the rings by which the commodities are taken up from the conveyor, in such a way as to afford mutually opposed heated surfaces positioned to enter into contact at least with the areas of the wrapper to be fastened when the commodity is taken up between the rings; and a diverting element located between the disks, adjustable for angular position about a given axis according to the operating speed of the machine, by which the commodities enveloped in the respective wrappers are directed ultimately between the rings not associated with the heat seal means in such a way that the duration of the heat sealing action remains unaltered whatever the operating speed of the machine.

The disks are spaced apart one from the other along their common axis by a distance such as will ensure that the commodities enveloped in the respective wrappers are taken up firmly between the rings. To advantage, the heat seal means are associated with the inner ring of each disk, and the axis about which the diverting element can be adjusted for angular position, according to the operating speed of the machine, is the axis of the pulley; thus, the wrapper enveloping each commodity is heat sealed, whereupon the commodity is diverted at a given moment from between the inner rings to the unheated outer rings, such that the duration of the heat sealing action remains unaltered whatever the operating speed of the machine.

BRIEF DESCRIPTION OF THE DRAWINGS

The invention will now be described in detail, by way of example, with the aid of the accompanying drawings, in which:

FIG. 1 shows the schematic frontal elevation of a device according to the present invention, in which certain parts are illustrated in section or cut away better to reveal others;

FIG. 2 shows the section through II—II in FIG. 1, on smaller scale.

DESCRIPTION OF THE PREFERRED EMBODIMENTS

FIG. 2 shows a device 1 by means of which wrappers fashioned from thermoplastic material are sealed through the controlled application of heat; such a device is suitable in particular for association with machines as used for packaging or overwrapping substantially parallelepiped commodities such as packets of cigarettes and the like.

As discernible from FIG. 1, such a machine comprises a conveyor 2 consisting in a belt 21 looped around at least one pulley 3 and affording a plurality of transverse slats 4 by which the commodities 5 are positively engaged and carried forward. The belt 21 is flanked on either side by fences 15 serving to restrain the end folds of the wrapper 6 enveloping each commodity 5 along the approach to the heat seal device 1. The folds are formed previously by conventional means not illustrated in the drawings.

The heat seal device 1 comprises a pair of disks 7 positioned one on each side of and coaxial with the pulley 3, which are set in motion synchronously with the conveyor 2. Each disk 7 comprises two concentric rings 8 and 9, of which the innermost is subject to the action of heat seal means 10 shown schematically in FIG. 1 as an electrical resistance connected to a source of electrical power 17 by way of conventional slip ring contacts 18.

The rings 8 and 9 are thermally isolated one from the other, for example by interposing a layer of heat insulating material 24, in such a way that the outer rings 9 are unaffected by the heat from the resistances 10.

11 denotes a diverting element extending in the conveying direction of the belt 21 between an area of substantially tangential association with a part of the belt passing over the pulley 3, and an area compassed by two outer rings 9. In practice, the diverting element 11 establishes an interception across the surface of the belt 21 supporting the commodities 5, in such a way that the commodities can be distanced from the pulley 3, hence from the heated inner rings 8, and transferred to a position between the unheated outer rings 9.

The diverting element 11 is adjustable for angular position about the axis of the pulley 3 in such a way as to permit of changing the point at which the commodities 5 are intercepted. Accordingly, if the diverting element 11 is positioned close to the point where the belt 21 begins to pass around the pulley 3 (see FIG. 2), the commodities 5 will be intercepted almost immediately, and practically prevented from coming into contact with the heated inner rings 8.

Conversely, by positioning the diverting element 11 remote from the point at which the belt joins the pulley, the commodities 5 remain within the compass of the inner rings 8 for a given duration before being directed toward the outer rings 9.

The diverting element 11 consists in two sectors 16 positioned concentrically with the pulley 3, one on each side. The surface of the sectors 16 positioned to interact with the commodities 5 will be seen to comprise an initial diverting stretch, denoted 161, and a successive cylindrical guiding stretch 162. This second guiding stretch 162 might operate in combination with a casing 29 positioned externally of the disks 7 and creating a channel by which the commodities 5 are directed forward and prevented from being flung outwards by centrifugal force.

To the end of obtaining precision control over the heat seal operation, the diverting element 11 is associated with actuator means 12, interlocked in turn to sensing means 13 that serve to monitor the angular velocity of the pulley 3; in the example of FIG. 1, the sensing means 13 measure the peripheral velocity of the shaft 19 onto which the pulley 3 is keyed, by interaction with a reference marker 191 located on the surface of the shaft.

The output from the sensing means 13 is connected to a unit 22 by which the operation of the entire machine is monitored and controlled; the electrical power source 17 is controlled likewise by this same unit 22.

The disks 7 and the sectors 16 of the diverting element 11 are also carried by the shaft 19 in a conventional manner, not illustrated in detail, but such in any event that the disks 7 are associated rigidly with the shaft 19 whilst the sectors 16 are mounted freely. The sectors 16 exhibit at least one portion of cylindrical profile, denoted 25, coaxial with the pulley 3 and affording gear teeth which engage in mesh with a pinion 26 keyed to the shaft of a motor 28 interlocked to the monitoring and control unit 22 and capable of rotation in either direction.

As to the proportions of the device, it will be observed from FIG. 1 that the belt 21 is narrower than the corresponding dimension of the commodity 5 and that the distance between the disks 7, measured transversely to the belt, is marginally less than the corresponding dimension of the commodity 5.

In a heat seal device 1 according to the invention, commodities 5 are carried along the conveyer 2, supported by the belt 21, propelled forward by the slats 4 and guided by the fences 15, to the point where they are taken up between the heated inner rings 8.

The moment that the wrapper 6 passes beyond the fences 15, at which point the end folds would tend to spread open if not restrained, it is taken up and compressed gently between the inner rings 8 whereupon the overlapping folds are invested with the heat from the resistances and begin to fuse together.

In order to avoid a situation in which the inner rings 8 seal the end folds of the wrapper 6 only at the edges, given that these generally are the parts which protrude farthest, the inner rings 8 might be embodied with a plurality of projections 14 smaller in width and depth than the corresponding folded end of the wrapper 6. The projections 14 will be distributed circumferentially around each of the inner rings 8 and positioned to coincide with the end faces of the successive commodities 5 when the rigidly associated disks 7 and pulley 3 are set in rotation. In this manner, only the central area of each end fold is subjected to the heat from the resistances 10.

On encountering the diverting element 11 the single commodities 5 are carried forward onto the initial diverting stretch 161 and distanced gradually from the axis of the pulley 3 until taken up completely between the outer rings 9, the effect of distancing the commodity 5 from the axis of the pulley 3 being to distance it also from the heated inner rings 8. Thus, it will be seen that the angular position of the initial stretch 161 determines the duration of the step in which the end folds of the wrapper 6 are heat sealed. It will be seen further that the slats 4 are of height such as to continue impinging on the single commodities throughout their passage between the disks 7.

With the inclusion of the sensing means 13 and the actuator means 12, it becomes possible to achieve an automatic and infinitely variable adjustment of the duration of the heat-seal action; by monitoring the angular velocity of the shaft 19, the sensing means 13 are able to monitor the operating speed of the machine, and on the basis of this information, suitably processed, the control unit 22 will cause the sectors 16 to rotate in one direction or the other about the axis of the pulley 3.

The advantages of a heat seal device 1 according to the present invention are numerous, with simplicity in construction being especially worthy of note. Moreover, the facility of varying the duration of the heat seal operation permits in turn of varying the operating speed of the machine without in any way affecting the timing of the heat seal device.

What is claimed:

1. A controlled heat seal device for fastening wrappers of thermoplastic material, in particular in overwrapping machines comprising a belt conveyor looped around at least one pulley and embodied with a plurality of transverse slats by which single commodities enveloped in respective wrappers, typically packets of cigarettes, are fed positively toward the device, comprising:

two mutually coaxial disks positioned on opposite sides of the conveyor, each consisting in at least one pair of concentric circular rings rotatable as one with the pulley and thermally insulated one from the other, disposed such that one ring of each pair operates in conjunction with the conveyor by taking up the commodities, each enveloped in a respective wrapper, from the surface of the belt;

heat seal means associated with the rings by which the commodities are taken up from the conveyor in such a way as to afford mutually opposed heated surfaces positioned to enter into contact at least with the areas of the wrapper to be fastened when the commodity is taken up between the rings; and a diverting element located between the disks, adjustable for angular position about a given axis according to the operating speed of the wrapping machine, by which the commodities enveloped in the respective wrappers are directed between the rings not associated with the heat seal means in such a way that the duration of the heat sealing action remains unaltered whatever the operating speed of the machine.

2. A device as in claim 1, comprising:

two mutually coaxial disks positioned on opposite sides of the conveyor, spaced apart one from the other along their common axis by a distance such that the commodities enveloped in the respective wrappers are taken up firmly between them, each of which consisting in at least one pair of concentric circular rings rotatable as one with the pulley and thermally insulated one from the other;

heat seal means associated with the inner ring of each disk and positioned to interact at least with the areas of the wrapper to be fastened;

a diverting element located between the disks, adjustable for angular position about a given axis according to the operating speed of the machine, by which the commodities enveloped in the respective wrappers are directed between the unheated outer rings in such a way that the duration of the heat sealing action remains unaltered whatever the operating speed of the machine.

3. A device as in claim 1, further comprising actuator means interlocked to sensing means capable of monitoring the angular velocity of the pulley, by which the diverting element is caused to rotate about the axis of the pulley and thus advance or retard along the direction in which the commodities are conveyed.

4. A device as in claim 2, further comprising actuator means interlocked to sensing means capable of monitoring the angular velocity of the pulley, by which the diverting element is caused to rotate about the axis of the pulley and thus advance or retard along the direction in which the commodities are conveyed.

5. A device as in claim 3, wherein the diverting element consists in a pair of sectors projecting radially from the axis of the pulley, each interposed between the conveyor and a relative disk.

6. A device as in claim 4, wherein the diverting element consists in a pair of sectors projecting radially from the axis of the pulley, each interposed between the conveyor and a relative disk.

7. A device as in claim 1, wherein the rings associated with the heat seal means are embodied with a plurality of corresponding projections, each subject to the action of the heat seal means and positioned in such a way as to engage and apply a determined compressive force to a central area of each end face afforded by the wrappers enveloping the commodities.

8. A device as in claim 2, wherein the rings associated with the heat seal means are embodied with a plurality of corresponding projections, each subject to the action of the heat seal means and positioned in such a way as to engage and apply a determined compressive force to a central area of each end face afforded by the wrappers enveloping the commodities.

9. A device as in claim 1, further comprising a casing disposed concentrically with and externally of the coaxial disks, serving to restrain and guide commodities enveloped by wrappers that have been heat sealed.

10. A device as in claim 2, further comprising a casing disposed concentrically with and externally of the coaxial disks, serving to restrain and guide commodities enveloped by wrappers that have been heat sealed.

* * * * *